United States Patent [19]

DeGooyer

[11] Patent Number: 4,539,347
[45] Date of Patent: Sep. 3, 1985

[54] NOVOLAC BASED EPOXY RESIN CURING AGENTS FOR USE IN AQUEOUS SYSTEMS

[75] Inventor: William J. DeGooyer, Louisville, Ky.

[73] Assignee: Celanese Corporation, New York, N.Y.

[21] Appl. No.: 652,581

[22] Filed: Sep. 20, 1984

[51] Int. Cl.$^3$ .................. C08G 59/50; C08L 63/02
[52] U.S. Cl. ................................. 523/404; 523/416; 525/484; 525/504
[58] Field of Search ............... 523/404, 416; 525/484, 525/504

[56] References Cited

U.S. PATENT DOCUMENTS

| | | | |
|---|---|---|---|
| 3,374,186 | 3/1968 | Steden et al. | 525/504 |
| 3,957,709 | 5/1976 | Holzrichter et al. | 523/416 |
| 4,093,594 | 6/1978 | Anderson | 524/901 |
| 4,111,900 | 9/1978 | Noetzel et al. | 524/139 |
| 4,166,900 | 9/1979 | Heimsch et al. | 526/317 |
| 4,246,148 | 1/1981 | Shimp et al. | 524/906 |
| 4,316,003 | 2/1982 | Dante et al. | 525/504 |

FOREIGN PATENT DOCUMENTS

| | | | |
|---|---|---|---|
| 47909 | 9/1979 | European Pat. Off. | 525/484 |
| 38-26092 | 12/1963 | Japan | 523/404 |

Primary Examiner—Ronald W. Griffin
Attorney, Agent, or Firm—Herbert P. Price

[57] ABSTRACT

The instant invention is an epoxy resin curing agent based upon an epoxy novolac containing, on the average, between about 3 and about 7.5 epoxy groups per molecule, in which substantially all of the epoxide groups are reacted with a polyamine wherein each primary amine hydrogen in the resulting reaction product is further reacted with a monoepoxide or a monocarboxylic acid. The resulting epoxy resin curing agent may be used in a water based system for curing epoxide resins. The curing agent is rendered water soluble or water dispersible by salting with a conventional volatile monocarboxylic acid such as acetic, formic or propionic acid.

22 Claims, No Drawings

NOVOLAC BASED EPOXY RESIN CURING AGENTS FOR USE IN AQUEOUS SYSTEMS

BACKGROUND OF INVENTION

1. Field of Invention

This invention relates to epoxide resin curing agents. More particularly, this invention pertains to novolac based polyamines which may be used to cure polyepoxides in aqueous based systems.

2. Prior Art

Solvent based epoxy resin curing agent systems have been known for many years. However, these solvent systems often are quite flammable, expensive and many have disagreeable odors.

Moreover, in recent years, increasingly strict regulation of environmental pollutants has lead to a limitation on the types and amounts of organic solvents which can be used in epoxy resin curable systems. The first approach to these limitations on the solvent content of coating systems was simply to employ a surfactant and emulsify or disperse existing polymeric systems in water. However, the cured products which resulted from these emulsions or dispersions often exhibited poor properties when compared to prior art solvent based systems. In particular, the chemical and water resistance of such systems was often lower because of the high levels of surfactant which were needed. Therefore, the search has continued to discover epoxy resin curing agent and curing agents systems which may be disbursed in water and which maintain the high performance levels of prior art solvent based systems.

U.S. Pat. No. 4,166,900 discloses cathodic electro deposition resin systems prepared based upon polyepoxides, polyamines and monoepoxides. While the monoepoxide and polyamine are similar to the products used in this invention, the polyepoxide utilized in U.S. Pat. No. 4,166,900 is quite different. Specifically in column 3, lines 47 to 68 there is no disclosure of the use of novolac type, highly branched, highly functional epoxy resins.

Likewise, U.S. Pat. No. 4,246,148 discloses an aqueous coating composition based upon an epoxy polyamine adduct end capped with monoepoxide. Again in the U.S. Pat. No. 4,246,148 it is made clear that highly functional, highly branched epoxides such as the novolac resin were not contemplated. Specifically in column 5, lines 10 to 20, a general formula is shown which clearly discloses a diepoxide, not a tri- or tetra-functional epoxide as contemplated by the applicant.

Thus it is the object of this invention is to prepare epoxy resin curing agents which are useful in aqueous based systems.

It is another object of this invention to prepare water based epoxy resin curing systems which exhibit properties which are equivalent to the properties of prior art solvent based systems.

These and other objectives are obtained by preparing the epoxide resin curing agents of the instant invention.

SUMMARY OF THE INVENTION

Basically the instant invention involves an ambient temperature curable coating system. This system is utilized to cure epoxide resins and involves a reaction product which contains about one mole of a novolac based polyepoxide having, on the average, at least 3 and no less than about 7.5, epoxy groups per molecule, in which substantially all epoxide groups have been reacted with a polyamine and wherein each primary amine group of said polyamines has further been reacted with a monoepoxide. These curing agents, may be employed in aqueous systems to provide superior cured state film properties.

DETAILED DESCRIPTION OF INVENTION

The first component of the instant invention is an epoxy novolac resin. In order to insure that the curing agents prepared according to the instant invention have the desired degree of branching, it is essential that the epoxy novolac resins utilized as the starting material have an average epoxy functionality of at least about 3 to about 7.5, preferably about 3 to about 4. In other words, the compositions of the instant invention should be prepared based upon a novolac containing from about 3 to 7.5 phenolic hydroxyl groups.

The novolac starting material is defined as the reaction product of a mono or dialdehyde most usually formaldehyde with a mono or polyphenolic material. Examples of the monophenolic materials which may be utilized to prepare the base novolacs useful in the instant invention include unsubstituted phenol and the various substituted phenols such as the cresols, alkyl and aryl substituted phenols such as p-tert-butylphenol, phenylphenol and the like. Polyphenolic materials such as the various diphenols including bisphenol-A and the like may also be utilized.

The aldehydes which are utilized to form the novolac materials of the instant invention are predominately formaldehyde (usually paraformaldehyde is the starting material). However, glyoxal may also be utilized, as may the higher alkyl aldehydes up to about the $C_4$ aldehydes. When glyoxal is employed it may be used to form a tetrafunctional novolac by reacting four moles of phenol with one mole of glyoxal.

In the typical reaction scheme, paraformaldehyde is reacted with phenol under acidic conditions to prepare a polyphenolic material or novolac. This material is then reacted with epichlorohydrin and dehydrohalogenated under basic conditions to produce the epoxy novolac resin. The procedures utilized to form epoxy novolacs from novolac starting materials are well known in the art and will not be repeated here.

As stated previously, the epoxy novolac resin useful herein, must have, on the average, at least about 3 epoxide groups and no greater than about 7.5 epoxide groups per molecule. When less than about 3 epoxide groups are present, the desired degree of crosslink density and branching in the cured product is not obtained. As a result curing agents prepared from these materials do not have the desired degree of toughness. On the other hand, when more highly functional materials, i.e. greater than about 7.5 epoxide groups per molecule are prepared, it is extremely difficult to process these materials and they often gel prior to the formation of the end product. In addition, the pot life of blends of these highly functional curing agents with epoxide resins is extremely short—in most cases too short for actual practical use.

Each site in the epoxy novolac which contains an epoxide group is reacted with a polyamine. The polyamines contain at least two amine nitrogen atoms per molecule, at least three amine hydrogen atoms per molecule, and no other groups which are reactive with epoxide groups. These polyamines can be aliphatic, or cycloaliphatic and contain at least two carbon atoms per molecule. Useful polyamines contain about 2 to about 6 amine nitrogen atoms per molecule, 3 to about 8 amine hydrogen atoms, and 2 to about 20 carbon atoms. Examples of such amines are the polyalkylenepolyamines, ethylene diamine, 1,2-propylene diamine, 1,3-propylene diamine, 1,2-butylene diamine, 1,3-butylene diamine, 1,4-butylene diamine, 1,5-pentylene diamine, 1,6-hexylene diamine, methane diamine, 1,4-diaminocyclohexane, meta-xylylene diamine and the like. Preferred amines for use in this invention are polyamines of the formula:

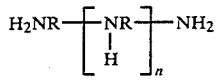

wherein n is of 0 to 4 and R is an an alkylene group containing 2 to 8 carbon atoms. Examples of such alkylene polyamines are ethylene diamine, diethylene triamine, triethylene tetramine, tetraethylene pentamine, pentaethylene hexamine, dipropylene triamine, tributylene tetramine, hexamethylene diamine, dihexamethylene triamine and the like. Mixtures of amines can also be used. The more preferred amines are the ethylene polyamines with the most preferred being triethylene tetramine and diethylene triamine.

The final component of the instant invention is an end capping agent. The end capping agent should be employed in an amount sufficient to react with substantially all primary amine groups (thereby providing extended pot life) and yield an end capped adduct which is compatible with the epoxy resin which is employed.

It has been found that one type of end capping agent which meet these requirements includes a monoepoxide or mixture of monoepoxides having (a) one 1,2-epoxide group per molecule and no other groups which are reactive with amine groups and (b) between about 9 and about 20, preferably between about 10 and 15, carbon atoms per molecule.

Representative examples of suitable aliphatic monoepoxides for use in the end capping agent include monoepoxidized terminally unsaturated straight chain hydrocarbons (also known as terminal olefin oxides) having between about 9 and about 16, preferably between about 11 and about 14, carbon atoms and mixtures thereof, such as decylene oxide, undecylene oxide, dodecylene oxide, tridecylene oxide, tetradecylene oxide, and pentadecylene oxide, monoglycidyl ethers of aliphatic alcohols, said glycidyl ethers having between 6 and 20 carbon atoms, and mixtures thereof, such as octyl glycidyl ether, nonyl glycidyl ether, decyl glycidyl ether, and dodecyl glycidyl ether; and monoglycidyl esters of saturated tertiary monocarboxylic acids, said esters having between about 9 and about 16, preferably between about 11 and about 14 carbon atoms, such as the glycidyl ester of versatic acid (i.e., a mixture of 9 to 11 carbon carboxylic acids used to make Cardura E), tert-octanoic acid, tert-nonanoic acid, tert-decanoic acid, tert-undecanoic acid, and tert-dodecanoic acid.

Representative examples of aromatic monoepoxides, i.e., at least one aromatic ring containing compound having attached thereto an epoxy functional group and no other reactive functional groups, include the monoglycidyl ethers of monohydric aromatic alcohols such as phenol and naphthanol, alkyl substituted monoglycidyl ethers of monohydric aromatic alcohols, said alkyl groups having from about 1 to about 4, or higher carbon atoms, such as monoglycidyl ether of p-tert-butyl phenol and o-cresol. The preferred aromatic monoepoxide is o-cresyl glycidyl ether.

Finally, oils containing up to about 24 carbon atoms per molecule and containing an unreacted epoxide group may also be used herein. Examples of such materials include epoxidized cashew nut oil.

Another type of end capping agent which meets the requirements of the instant invention is a monocarboxylic acid. If the carboxylic acid contains unsaturation, the unsaturation must be no closer than 3,4 to the carboxylic acid group and in addition the unsaturated carboxylic acid should contain at least 4 to about 22 carbon atoms per molecule. If the monocarboxylic acid is saturated, it should contain from about 5 to about 11 carbon atoms. Examples of the unsaturated acids include most of the drying oil based fatty acids particularly linseed fatty acid. Monocarboxylic acids include various $C_5$–$C_{11}$ straight chain and branched chain carboxylic acids including preferably pelargonic acid.

In preparing the epoxy-amine adducts of this invention, the polyepoxide resin and the polyamine are reacted under such conditions that the adduct so formed contains about 1 mole of polyamine for each epoxide group originally present in the polyepoxide resin, i.e., about one mole of polyamine is reacted with each epoxide equivalent of the polyepoxide.

The reaction between the epoxy novolac, the polyamine and the monoepoxide is not difficult to carry out. Preferably the epoxy novolac is reacted with a relatively large excess of the polyamine at temperatures of approximately 200° to 300° F. In general it is preferred that the epoxy novolac be added to the amine over a period of time—generally about one to four hours. The amount of excess which is employed varies depending upon the reactivity of the various reactants which are chosen. At least about 2.25 and preferably at least about 3 moles and no more than about 10 moles of amine are employed for each epoxide equivalent present in the epoxy novolac. After all of the novolac has been added, the materials are allowed to react at reaction temperature for approximately one to four hours.

The preparation of adducts of polyepoxide resins and polyamines is described in further detail in U.S. Pat. Nos. 4,093,594 and 4,111,900, the disclosures of which are hereby incorporated by reference.

When the adducting reaction is completed, unreacted amine, if any, is removed by vacuum distillation or by steam sparging under vacuum distillation, at temperatures of not greater than about 500° F. If temperatures in excess of 500° F. are employed, the adduct will discolor. The steam sparging is conducted in a manner sufficient to reduce the presence of unreacted amine in the adduct to an amount not greater than about 0.5% by weight, based on the weight of the adduct. If unreacted amine is present in amounts greater than about 0.5%, the pot life of the mixture of the curing agent and the polyepoxide which forms upon mixing the two components described herein will be reduced substantially.

Many epoxy novolac resins are supplied by the manufacturer dissolved in a ketone which will interfere with the reaction between the novolac and the amine. In such situations it is necessary to remove the ketone prior to reaction between the novolac and the amine. This is carried out by heating the epoxy novolac under vacuum and replacing the ketone with a hydrocarbon solvent such as toluene or xylene.

Because at this point in the reaction scheme, after the epoxide resin has reacted with the polyamine, the product may be extremely heavy, it is preferred that an oxygenated solvent or co-solvent as described hereafter, such as 2-propoxy ethanol, be added to the reaction mixture to reduce its viscosity. In general about 20 to about 50 percent by weight of 2-propoxy ethanol or another oxygenated solvent may be added at this point to control processing viscosity.

When the epoxy-amine adduct formation has been completed and the unreacted amine has been removed, the end capping agent is reacted therewith at a temperature of about 65° C. to about 150° C. for a time sufficient to bring the reaction to completion, typically about 5 minutes to 3 hours. Lower temperatures may be employed at the expense of increasing the reaction time.

The maximum amount of the end capper which can be reacted with the epoxy-amine adduct is influenced by whether a monoepoxide is employed as a diluent for the epoxy resin as described hereinafter. It has been found that if too many of the reactive amine groups of the epoxy-amine adduct are defunctionalized before or during reaction with the epoxy resin, either by reaction with the monoepoxide end capping agent or by eventual reaction with the diluent which can accompany the epoxy resin, then the epoxy resin will not react to the desired extent with the end capped adduct and the cured film will be soft and exhibit poor solvent resistance.

The minimum amount of end capping agent which is reacted with the epoxy-amine adduct is controlled by the improvement in wettability sought to be imparted to the coating composition and the adverse effect on pot life which the presence of primary amines would impart to the coating composition.

The presence of a significant amount of primary amines on the end capped epoxy-amine adduct in an aqueous system reduces the pot life of the system to an unacceptable extent due to their high reactivity and will result in either a rapid viscosity drop or increase depending on the molecular weight of the polyepoxide employed to prepare the epoxy-amount adduct. In addition, primary amine groups in the finished product tend to form amine carbonates producing undesirable amine "sweating". Thus, the amount of end capping agent must at least be sufficient to substantially eliminate the presence of primary amines on the epoxy amine adduct. Generally the maximum amount of the encapping agent should be no more than about 1.2 moles per primary amine group.

After the reaction is completed, the material is reduced in a solvent or co-solvent for the system. In general, the amount of the solvent that is added is not greater than about 45% and is typically about 5 to about 45% by weight based on the weight of the adduct and co-solvent, preferably no greater than about 40%. Examples of the solvent include ethers, alcohols, glycol ethers, ketones and the like. The preferred solvents are the glycol ethers such as the various lower alkyl ethers of ethylene and propylene glycol.

After the above product is prepared, it is salted using a volatile acid and then dissolved in water. The degree of salting of the epoxy amine adduct is herein defined to be the number of equivalents of acid sufficient to react with the total number of amine nitrogen equivalents in the end capped epoxy-amine adduct expressed as a percentage of the total number of amine nitrogen equivalents in the system. Thus, a 15% degree of salting indicates that the end capped epoxy-amine adduct has been reacted with sufficient acid to convert 15% of the amine nitrogens present on the adduct to their corresponding salt.

The particular degree of salting is selected to control, as desired, a number of factors such as cure temperature, cure speed, pot life and dispersability. As the degree of salting increases, the cure time at a fixed temperature increases along with pot life. For industrial maintenance coatings the degree of salting is selected to achieve an ambient temperature curing system and the associated reduction in pot life at the lower degrees of salting is an acceptable trade off.

In general, the end capped epoxy-amine adduct is reacted with sufficient acid to achieve a degree of salting of from about 2 to about 65%, preferably from about 2 to about 20%.

The volatile acid used herein includes both organic and inorganic acids and is defined to be an acid which will substantially completely evaporate at the temperature at which drying and curing occur. The volatile organic acids may be aliphatic, cycloaliphatic, or heterocyclic and may be saturated or unsaturated. Representative examples of volatile organic acids include acetic acid, formic acid, propionic acid, butyric acid, acrylic acid, methacrylic acid, and cyclohexanoic acid. The organic acid will preferably be an aliphatic monocarboxylic acid having up to 4 carbon atoms. Representative examples of volatile inorganic acids include hydrochloric acid, hydrobromic acid, and hydrofluoric acid. The preferred acids are acetic, formic and propionic acids.

The salted end capped epoxy-amine adduct in addition to acting as the principal film forming resin of the cured composition, acts as a surfactant aiding the incorporation of the epoxy resin into the two component blend and the subsequent formation of a very small particle size emulsion.

The solids content of the salted end capped epoxy-amine adduct may be reduced, prior to mixing with the second component by dilution with water. Preferably the reduced solids content is in the range of about 55 to about 85%, by weight.

The second component of the coating system is a low molecular weight, water dispersible (either alone or in the presence of a co-solvent) epoxy resin having more than one terminal epoxide group. The epoxy resins suitable for use in the second component include the glycidyl polyethers of dihydric phenols as well as epoxy novolac resins. The dihydric phenols employed to prepare the epoxy resins are further described in U.S. Pat. No. 4,246,148. It is particularly preferred to employ those glycidyl polyethers wherein the dihydric phenol is bisphenol-A.

The maximum molecular weight of the epoxy resins is limited by the fact that the amount of epoxy resin employed in the second component is usually selected to achieve stoichiometric equivalence of epoxy groups with the amine hydrogen equivalents of the end capped epoxy-amine adduct. Consequently, as the molecular weight of the epoxy resin increases, thereby increasing the epoxide equivalent weight, more of the epoxy resin is required to satisfy the stoichimeteric requirement. However, the use of large amounts particularly of higher molecular weight epoxy resins is not preferred because it is water insoluble and becomes increasingly more difficult to micoremulsify or disperse as the amount thereof is increased.

In view of the above, it is preferred to characterize the epoxy resin also in terms of its epoxide equivalent weight. Thus the epoxide equivalent weight (WPE) of the glycidyl polyethers of dihydric phenols is not greater than about 1000, preferably from about 180 to about 700.

As described above, the amount of epoxy resin which is present in the coating composition is preferably sufficient to achieve substantially stoichiometric equivalence with the reactive amino hydrogens on the end capped epoxy-amine adduct. In general, it is preferred to employ the epoxy resin in an amount sufficient to achieve an epoxy to reactive adduct amine hydrogen equivalent weight ratio of from about 0.5:1.0 to about 1.5:1.0, and, preferably, from about 0.9:1.0 to about 1.1:1.0.

The epoxy resins which are useful herein, may be either liquids or solids. In the case of liquid epoxy resins, such as, for example, the diglycidyl ethers of bisphenol-A, it is possible to prepare a dispersion of the epoxy resin in the curing agent without the need to add a co-solvent or other surfactants. In these situations the salted curing agent acts as a surfactant to disperse the liquid epoxy resin. However, where the epoxy resin is solid, even in the presence of a co-solvent, the mere mixing of the epoxy resin curing agent and the epoxy resin often will not result in a permanent dispersion. Particularly as the viscosity of the curing agent increases above about 10,000 cps, the presence of a diluent for the epoxy resin becomes increasingly more preferred. More importantly, however, in order to insure that a stable dispersion is prepared particularly with higher molecular weight epoxy resins, the use of a nonionic surfactant of the polyether type is particularly preferred. These surfactants are well known and will not be described further. In general, the amount of such surfactants should not exceed about 10% by weight, based on the total weight of the epoxy resin and the curing agent.

The co-solvent/diluent has been described above and is more particularly describe in U.S. Pat. No. 4,246,148 at columns 12 thru 14 which are incorporated by reference herein.

When the epoxy resin and the curing agent are mixed, the resulting coating composition exhibits a pot life at room temperature of from about 2 hours to about 12 hours, and preferably from about 3 hours to about 8 days.

The pot life of the coating composition is herein defined to be the elapsed time from mixing the components together until the resulting composition is no longer suitable, with normal thinning, for application by spray, brush, or roll coating techniques to a substrate. The suitability for application by common techniques can be expressed in terms of the viscosity of the coating composition. Thus, the pot life of unpigmented coatings can be characterized as the elasped time for mixing the two components to the time when the viscosity of the coating compositions drop below $A_1$ or increases above Z as determined by the Gardner-Holdt method. For pigmented coatings, useful applications viscosities are between 50 and 140 Kreb Units (K.U.) as determined with a Stormer viscometer. Typically the viscosity of the coating composition will increase until the microemulsion either breaks, in which case the epoxy resin settles into a separate layer accompanied by a substantial reduction in viscosity, or until crosslinking reactions take place accompanied by a substantial increase in viscosity.

Coatings based on the compositions described herein can be formulated into easily handled two-package systems which blend together as easily as their solvent based counterparts. Applications properties are excellent. Application by brush, spray and roller-coating are remarkably free of bubbling and other film imperfections.

The coating systems described herein also exhibit good adhesion to such widely varied substrates as galvanized metal, cold rolled steel (untreated and phosphate treated), hot rolled steel, and aluminum. Flash rusting is not a problem over untreated steel and, therefore, there is no need for special additives as in some water reducible epoxy systems. Adhesion is also excellent to three and four-year old alkyd and epoxy ester enamel films. Such systems may therefore be employed for repaint purposes in food processing plants and dairies and can also be used as adhesive compositions per se.

As pointed out above the major advantage of the coating compositions of the instant invention is that they are useful in preparing solvent and chemically resistant coating compositions from aqueous based systems. These systems do not exhibit the traditional solvent related problems shown by solvent based systems and accordingly are preferred in end-use applications where nonpolluting or nonflammable coatings systems are necessary. In addition, the cured state properties of compounds made from the curing agents disclosed herein are equivalent to the properties of compounds prepared from prior art solvent based systems.

The invention is additionally illustrated in connection with the following examples which are to be considered as illustrative of the present invention. It should be understood, however, that the invention is not limited to the specific details of the examples. All parts and percentages in the claims as well as in the remainder of the specification are by weight unless otherwise specified.

EXAMPLES

Example 1

Into a reactor equipped with a mechanical agitator, sampling tube, condensor and gas inlet tube were added 1500 parts of triethylene tetramine. A nitrogen sparge was begun and the material was heated to 200° F. 750 parts of an epoxy novolac resin[1] having an average epoxy functionality of 3.6, a solids content in toluene of 84% and a weight per epoxide (WPE) of 184, were added to the reactor over a 1 hour and 20 minute period holding the temperature at about 200° F. The mixture was then held at 195° F. for approximately 50 minutes. It was then heated gradually to 440° F. over approximately 2 hours under a vacuum of 10 Torr. The mixture was then cooled to about 300° F., the vacuum was removed, and 558 parts 2-propoxy ethanol were added to the reactor at a temperature of about 245° F. 623 parts of cresyl glycidyl ether (WPE 182) were then added to the reaction mixture over approximately ½ hour period. The mixture was held at about 260° F. for approximately ½ hour at which point 53 parts of acetic acid and 558 parts of 2-propoxy ethanol were added to the mixture. The resulting product exhibited a Gardner Holdt 25° C. viscosity of $Z_3$–$Z_4$, a solids content of 60.7% and an acid value of 29.7.

[1]The resin is based upon DEN 438 available from the Dow Chemical Corporation dissolved in acetone. In order to be useful in this invention it is necessary to strip off the acetone and dissolve the resulting epoxy novolac polymer in toluene.

Example 2

Utilizing essentially the same procedure as in Example 1, an acetic acid salt of an ambient temperature, epoxy resin, curing agent was prepared except that instead of utilizing 3.5 equivalents of cresyl glycidyl ether, 3.29 equivalents of cresyl glycidyl ether and 0.21 equivalents of butyl glycidyl ether (WPE 167) were employed. The resulting product exhibited a Gardner Holdt 25° C. viscosity of $Z_4$–$Z_5$, a solids content of 60.1% and an acid value of 27.8.

Example 3

Utilizing essentially the same procedure as described in Example 1, an ambient temperature curable, acetic acid salt of an epoxy resin curing agent was prepared in which the triethylene tetramine was replaced on an equivalent basis with meta-xylylene diamine. The resulting product exhibited a Gardner Holdt 25° C. viscosity of $Z_4$–$Z_5$ at 59.9% solids and an acid value of 26.5.

Example 4

Utilizing essentially the same procedure as described in Example 1, an ambient temperature curable acetic acid salt of an epoxy resin curing agent was prepared in which the triethylene tetramine was replaced on an equivalent basis with diethylene triamine. The resulting product exhibited a Gardner Holdt 25° C. viscosity of $Z_2$–$Z_3$, a solids content of 60.0% and an acid value of 30.1.

Example 5

Utilizing essentially the same procedure as described in Example 1, an epoxy resin curing agent was prepared except that the acetic acid was replaced with formic acid at 2% by weight level based on the product's solids content. The resulting product exhibited a Gardner Holdt 25° C. viscosity of $Z_4$–$Z_5$, a solids content of 60.8 and an acid value of 24.9.

Example 6

Utilizing essentially the same procedure as in Example 1, an epoxy resin curing agent was prepared except that the amount of triethylene tetramine used to react with the epoxy novolac was reduced from 10.5 moles as in Example 1 to 8 moles. In addition, 50% of the 2-propoxy ethanol was replaced on a weight basis with methyl isobutyl ketone. The resulting product exhibited a Gardner Holdt 25° C. viscosity of $Z_4$, a solids content of 58.9% and an acid value of 27.9.

Examples 7–10

Blends were prepared as set forth in Table I below by mixing initially the epoxy resin, aqueous dispersion in the amounts indicated with water. The epoxy resin dispersion is a bisphenol-A based polyglycidyl ether having a weight per epoxide in the range of about 600–700, a solids content of 55% water and is available from the Celanese Speciality Resins Company under the resin number of W-55-5522. After the initial epoxy resin dispersion/water blend was prepared a second blend of the epoxy resin curing agent prepared in Example 6, a titanium dioxide pigment and water was also prepared. The resulting products were then mixed and reduced to spray viscosity by adding 35 parts of water. (In the case of Example 10, 25 parts of water were added.) The blends were then spray applied to cold rolled steel panels to a thickness of about 2 mils and allowed to cure at room temperature for one week. In Table II, are shown the hours-to-failure of the various coating when subject to the indicated tests. As can be seen from Table II, the compositions of this invention possess excellent cured state film properties even when subject to a variety of chemical resistance tests.

TABLE I

| | BLEND COMPOSITIONS | | | | |
|---|---|---|---|---|---|
| Example | Epoxy Disp (parts) | Water (parts) | Ex. 6 (parts) | $TiO_2$ (parts) | Water (parts) |
| 7 | 490.9 | 124.7 | 150.0 | 250.0 | 40.1 |
| 8 | 523.6 | 94.1 | 120.0 | 250.0 | 69.8 |
| 9 | 556.3 | 63.6 | 90.0 | 250.0 | 99.7 |
| 10 | 589.1 | 33.0 | 60.0 | 250.0 | 129.4 |

TABLE II

| | | | | | CHEMICAL RESISTANCE | | | | | | | |
|---|---|---|---|---|---|---|---|---|---|---|---|---|
| Ex. | Wt. % Epoxy | Wt. % Curing Agent | Pencil Hardness | Acetic Acid | HCl | $H_2SO_4$ | $HNO_3$ | NaOH | $H_2O$ | Salt Spray (hours) | Humidity Resistance (hours) | MEK Rubs |
| 7 | 75 | 25 | 2H | 24 | 168 | 168 | 168 | >1000 | >1000 | 840 | 1000 | 100 + 2H |
| 8 | 80 | 20 | 2H | 24 | 168 | 168 | 168 | >1000 | >1000 | 840 | 1000 | 100 + 2H |
| 9 | 85 | 15 | H | 24 | 168 | 336 | 336 | >1000 | >1000 | 1000 | 1000 | 100 + >HB |
| 10 | 90 | 10 | B | 48 | 168 | 840 | 336 | >1000 | >1000 | 1000 | 1000 | 93 |

I claim:

1. A novolac based epoxy resin curing agent comprising a volatile acid salt of the reaction product of an epoxy novolac compound and a primary amine containing polyamine wherein substantially all of the epoxy groups are reacted with the polyamine and wherein substantially at least all of the unreacted primary amine groups in the polyamine/epoxide reaction product are reacted with a monoepoxide or a monocarboxylic acid.

2. The curing agent of claim 1 wherein, the epoxy novolac is prepared by epoxidizing the reaction product of a phenol and formaldehyde to produce an epoxy containing product having, on the average, about 3 to 7.5 epoxide groups per molecule.

3. The curing agent of claim 1 wherein the novolac is a phenol/formaldehyde based novolac.

4. The curing agent of this claim 3 wherein the phenol is at least in part bisphenol-A.

5. The curing agent of claim 1 wherein the novolac is based at least in part on glyoxal.

6. The curing agent of claim 1 wherein the polyamine is a polyalkylenepolyamine.

7. The curing agent of claim 1 wherein the polyamine has the formula:

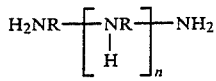

wherein n is 0 to 4 and R is an alkylene or arylene group containing 2 to 8 carbon atoms.

8. The curing agent of claims 6 or 7 wherein the amine is selected from diethylenetriamine, triethylenetetramine, tetraethylenepentamine and meta-xylylene diamine.

9. The curing agent of claim 1 wherein the monoepoxide is an aromatic monoepoxide.

10. The curing agent of claim 1 wherein the monoepoxide is cresyl monoglycidyl ether or cashew nut oil monoepoxide.

11. The curing agent of claim 1 wherein the monocarboxylic acid is a $C_4$–$C_{22}$ unsaturated monocarboxylic acid or a $C_5$–$C_{11}$ saturated monocarboxylic acid.

12. The curing agent of claim 11 wherein the monocarboxylic acid is selected from pelaragonic acid and drying oil based fatty acids.

13. The curing agent of claim 1 wherein the volatile acid is selected from the group consisting of formic acid, acetic acid and propionic acid.

14. An ambient temperature curable coating composition comprising an aqueous solution or dispersion of the composition of claim 1 in admixture with a polyepoxide.

15. The composition of claim 14 wherein the polyepoxide is a polygycidyl ether of dihydric phenol.

16. The composition of claim 15 wherein the dihydric phenol is bisphenol-A.

17. The composition of claim 14 wherein the polyepoxide has a weight per epoxide of no greater than about 1000.

18. The composition of claim 17 wherein the polyepoxide has a weight per epoxide of about 180 to about 700.

19. The composition of claim 14 wherein the ratio of the epoxy groups in the polyepoxide to reactive amine hydrogen groups in the curing agent is in the range of 0.5 to 1.0 to about 1.5 to 1.0.

20. The composition of claim 14 in admixture with a co-solvent.

21. The composition of claim 20 wherein the co-solvent is an oxygenated solvent.

22. The composition of claim 21 wherein the co-solvent is a glycol based ether.

* * * * *